United States Patent
Linsky et al.

(10) Patent No.: US 6,781,447 B2
(45) Date of Patent: Aug. 24, 2004

(54) MULTI-PASS PHASE TRACKING LOOP WITH REWIND OF CURRENT WAVEFORM IN DIGITAL COMMUNICATION SYSTEMS

(75) Inventors: Stuart T. Linsky, Rancho Palos Verdes, CA (US); Scott A. Cooper, Seattle, WA (US); Christopher W. Walker, Stevenson Ranch, CA (US); Ali R. Golshan, Hawthorne, CA (US)

(73) Assignee: Northrop Grumman Space & Mission Systems Corporation Space Technology, Redondo Beach, CA (US)

( * ) Notice: Subject to any disclaimer, the term of this patent is extended or adjusted under 35 U.S.C. 154(b) by 262 days.

(21) Appl. No.: 10/004,582

(22) Filed: Dec. 4, 2001

(65) Prior Publication Data

US 2003/0112914 A1 Jun. 19, 2003

(51) Int. Cl.⁷ .................................................. H03D 3/00
(52) U.S. Cl. ...................... 329/304; 329/307; 375/324; 375/326; 375/329; 375/376
(58) Field of Search ................................ 329/304, 307; 375/324, 326, 327, 329, 376

(56) References Cited

U.S. PATENT DOCUMENTS

2003/0103582 A1 * 6/2003 Linsky et al. ................ 375/327
2003/0123595 A1 * 7/2003 Linsky et al. ................ 375/376

* cited by examiner

*Primary Examiner*—Arnold Kinkead
(74) *Attorney, Agent, or Firm*—Antonelli, Terry, Stout & Kraus, LLP

(57) ABSTRACT

A demodulator demodulates a modulated signal waveform in a data communication system. A phase tracking loop tracks the phase of said modulated signal waveform and having an inner block decoder configured to decode a set of vector pairs of the modulated signal waveform at a decode rate to generate associated codewords and phase estimates. A group of data symbols consisting of the first data symbols of the modulated signal waveform are run backwards through the phase tracking loop. An outer block decoder receives the associated codewords generated by said inner block decoder and utilizes and corrects only codewords associated with symbols after and including the group of data symbols consisting of the first data symbols of the modulated signal waveform.

24 Claims, 6 Drawing Sheets

US 6,781,447 B2

MULTI-PASS PHASE TRACKING LOOP WITH REWIND OF CURRENT WAVEFORM IN DIGITAL COMMUNICATION SYSTEMS

BACKGROUND OF THE INVENTION

1. Field of Invention

The present invention relates to communication systems. In particular, the present invention relates to demodulators which use a phase tracking loop (PTL) to track the phase of a modulated signal waveform.

2. Discussion of the Related Art

In burst communication systems, particularly digital communication systems comprising a communication transmitter for digital data transmission and a communication receiver for digital data reception via a channel, it is known to impress intelligent information to be conveyed onto a carrier for transmission by one of many different modulation techniques, including binary phase shift keying (BPSK) modulation or quaternary phase shift keying (QPSK) modulation. The burst consists of a preamble portion and a data portion. A demodulator in the communications receiver includes a phase tracking loop (PTL) which determines an initial estimate of the phase of the modulated signal using the preamble portion. The phase tracking loop is initialized with the phase estimate and thereafter constantly calculates an estimate of the transmitter's phase so that it continuously tracks the incoming signal during reception and demodulation of the data portion.

Conventionally, a demodulator uses a phase tracking loop to track and coherently demodulate the modulated signal waveform received from a transmitter so that it may be transformed back into the fixed phase space of the transmitter. There are a number of different types of phase tracking loops employing phase locked principles such as squaring loops, Costas tracking loops, and decision-directed feedback loops for performing phase tracking of either a BPSK or QPSK modulated signal. A commonly used method for performing this type of phase tracking is a digital decision directed phase locked loop (DD-PLL). The basic principle of decision directed phase locked loops (DD-PLLs) is well known as described in the classic "Telecommunication Systems Engineering" text by William C. Lindsey and Marvin K. Simon, originally published by Prentice-Hall in 1973, and the "Digital Communications" text by Kamilo Feher, originally published by Prentice-Hall in 1983 and republished by Noble Publishing Corp. in 1997. Generally, the input to a digital decision directed phase locked loop (DD-PLL) typically consists of only the phase angles of a sequence of complex data sample pairs obtained by down converting the incoming BPSK or QPSK modulated signal to a baseband quadrature (orthogonal) pair, 10 digit combination, passing these through matched filters and sampling the results at the symbol rate. This sampled pair may be considered as a complex variable in rectangular form. The complex variable is converted to polar form to produce the equivalent variable pair. The apparent incoming phase is referenced to the currently estimated phase (i.e. the tracked phase) to form the phase difference. The phase difference between the incoming phase and the estimated phase is influenced by the true difference between the phase systems of the transmitter and the receiver, by phase and thermal noise present at the receiver, and also by the symbol's data content which changes the angle by a multiple of $\pi/2$ for QPSK or of $\pi$ for BPSK. The polar form is then transformed back into the rectangular form, for subsequent processing, including soft decision decoding when error control is being utilized.

In conventional phase tracking circuits, the effect of the data content on the phase difference between the incoming phase and the estimated phase is compensated by making a "hard" decision on the data content of each individual BPSK or QPSK symbol on the rectangular coordinates. A standard phase detector generates phase error measurements for each BPSK or QPSK symbol, based on the hard decision of each symbol. In the absence of noise in the baseband quadrature pair, the estimated phase decision, which is based on each individual BPSK or QPSK symbol, is always correct so that the resultant phase error measurement equals the true difference between the phase systems of the transmitter and the receiver. The value of the resultant phase error measurement is then filtered to yield an updated estimate for use at the next symbol epoch, forming a classical servo loop.

In practice, noise is always present so that the resultant phase error measurement may be grossly distorted, especially when an incorrect decision is made in converting the phase difference between the incoming phase and the estimated phase to the resultant phase error measurement. As long as the bit error rate (BER) is small, many existing symbol-by-symbol decision directed phase locked loops (DD-PLLs) perform well. However, at low signal-to-noise ratios, the BER can be relatively high which means that the phase detector can also be unreliable. The initial phase error can be as much as +/−30 degrees when phase tracking of the data portion of the burst begins. Although correction algorithms such as Reed-Muller can be used to correct random errors, high initial phase error nevertheless results in high codeword error rates because it is difficult for the phase locked loop to lock and to correct for large phase errors. The effect of large initial phase errors, together with the large amount of noise entering the loop, may cause the demodulator to perform unacceptably when demodulating the beginning of the data portion. Indeed, the presence of large phase errors, either initially or during tracking, typically results in dropped cells. For burst communication systems, such as time division multiplexed access (TDMA), and especially for satellite communication systems with low signal-to-noise ratios, there is a need to reliably demodulate and decode the data portion of each burst and to reduce the number of dropped cells. Eliminating large errors in the initial phase estimates in the demodulator phase tracking loop can reduce the number of dropped cells.

For at least the above reasons, conventional decision directed phase locked loops (DD-PLLs) may fail to adequately track the phase of a phase shift keying (PSK) modulated signal, and to minimize the error rate for recovered data, especially significant errors at the beginning of phase tracking which result in dropped cells. This consequence is particularly damaging for digital communication systems such as satellite communication systems that utilize error correction codes and large constellation signal sets to communicate at very low signal-to-noise ratios. FIG. 8 graphically illustrates the relationship between the actual phase of a communications waveform and the estimate of the communications waveform in a phase tracking loop of a demodulator over time.

BRIEF SUMMARY OF THE INVENTION

Accordingly, it is an object of the present invention to provide a communications receiver for use in satellite communication systems which compensates for possibly large errors in the initial phase estimates of a phase tracking loop and reduces the codeword error rate at the beginning of phase tracking due to poor initial phase estimates.

It is further an object of the present invention to provide a communications receiver using a short block of biorthogonal codes (e.g., Reed-Muller codes) within a phase tracking loop (PTL) of a demodulator and to improve the cycle slip and cell loss rate (CLR) when tracking the phase of a phase shift keying modulated signal waveform.

Yet another object of the invention is to run a group of data symbols at the beginning of a communications waveform backwards through the phase tracking loop in a demodulator to correctly demodulate that first group of data symbols.

These and other objects of the present invention may be achieved by a demodulator for demodulating a modulated signal waveform in a data communication system, comprising: a phase tracking loop tracking the phase of said modulated signal waveform and having an inner block decoder configured to decode a set of vector pairs of the modulated signal waveform at a decode rate to generate associated codewords and phase estimates, wherein a group of data symbols consisting of the first data symbols of the modulated signal waveform are run backwards through the phase tracking loop; and an outer block decoder and which utilizes and corrects only codewords associated with symbols after the group of data symbols consisting of the first data symbols of the modulated signal waveform. The outer block decoder receives all of the groups of data symbols, but there will probably be fewer errors in the first group of data symbols than there would have been if the data was not run backwards.

In accordance with yet another aspect of the present invention, a communication receiver uses a demodulator demodulating a modulated signal waveform from a transmission channel which is encoded by a sequence of codewords, comprising: a down converter which generates a succession of baseband signal samples of said input modulated signal including an in-phase component and a quadrature-phase component; a first converter which converts said succession of baseband signal samples of said input modulated signal from a rectangular form into a pair of polar coordinates having an incoming phase; a phase tracking loop which estimates the phase of said input modulated signal, said phase locked loop comprising: a comparator which generates a phase difference of said incoming phase of said input modulated signal and an estimated phase; a second converter which converts said polar coordinates having said phase difference into a set of vector pairs of phase stabilized observables in said rectangular form; a first block decoder which decodes said set of vector pairs of phase stabilized observables in said rectangular form at a decode rate to generate associated codewords; and a loop filter which filters said phase error estimate from said block decoder to yield an update of said estimated phase at each codeword, wherein a group of data symbols consisting of the first data symbols of the modulated signal waveform are run backwards through the phase tracking loop and a second block decoder which receives the associated codewords generated by said inner block decoder and which utilizes and corrects only codewords associated with symbols after and including the group of data symbols consisting of the first data symbols of modulated signal waveform that have been run backwards through the phase tracking loop.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

Figure 1:
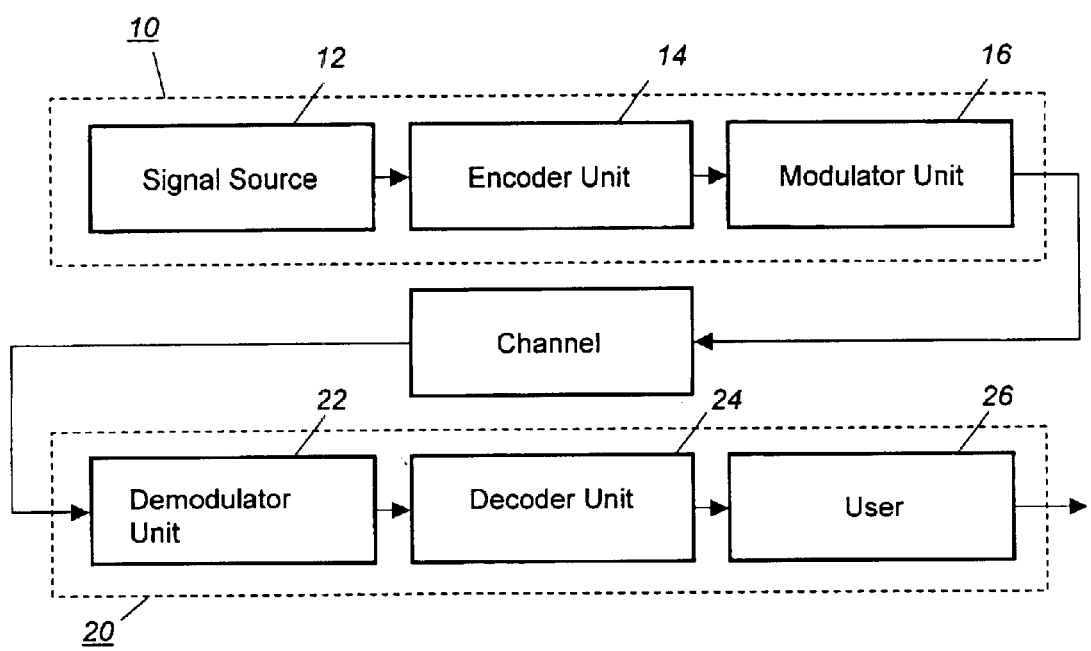
FIG. 1 illustrates an exemplary data communication system comprising a transmitter for digital data transmission and a receiver for digital data reception via a transmission channel.

FIG. 1 of the drawings illustrates a model of an exemplary digital communication system for digital data communications. As shown in FIG. 1, the digital communication system comprises a transmitter 10 for digital data transmission and a receiver 20 for digital data reception via a transmission channel. The transmitter 10 includes an information source 12 for sending information or data in terms of samples, an encoder unit 14 for encoding data samples into data symbols comprised of binary digits (bits), and a modulator unit 16 for modulating the data symbols into a set of signals in accordance with a carrier using various digital modulation techniques such as either binary phase shifting keying (BPSK) or quaternary phase shift keying (QPSK) modulations for radio transmission via a channel. Data samples may be encoded by several available methods including the use of a generator matrix, the use of a feedback shift register with an equivalent generator polynomial, or the use of a look-up table.

The receiver 20 includes a demodulator unit 22 for receiving and demodulating an incoming binary phase shift keying (BPSK) or quaternary phase shift keying (QPSK) modulated signal as a sequence of binary digits, and a decoder unit 24 for decoding the binary digits from the demodulator unit 22 to recover data samples of original data for user 26. Demodulator unit 22 may include a downconverter for down converting an incoming BPSK or QPSK modulated signal into an intermediate frequency signal, a synchronous demodulator for demodulating an intermediate frequency signal from a form of a baseband quadrature pair (p(t), q(t)) into a sequence of complex sample pairs (p(j), q(j)), and a matched filter & sampler (or cross-correlators) for passing the sequence of complex sample pairs (p(j), q(j))

and sampling the results at the jth symbol epoch. Cross-correlators may preferably be used in lieu of the matched filters for passing the sequence of complex sample pairs (p(j), q(j)). This sample pair may be considered as a complex variable in rectangular form.

When the BPSK or QPSK modulated signal is sent on a carrier from the transmitter 10, the phase space of the receiver 20 is generally different from that of the transmitter 10 due to frequency difference between the local oscillators at the transmitter 10 and receiver 20 and the effect of varying delays and frequency shifts in the propagation path between the two sites. To coherently demodulate the received signal at the receiver 20, the demodulator unit 22 commonly uses a decision directed phase locked loop (DD-PLL) for forming an estimate of the phase of the transmitter 10 so that the tumbling received signal may be transformed back into the fixed phase space of the transmitter 10.

Figure 2:
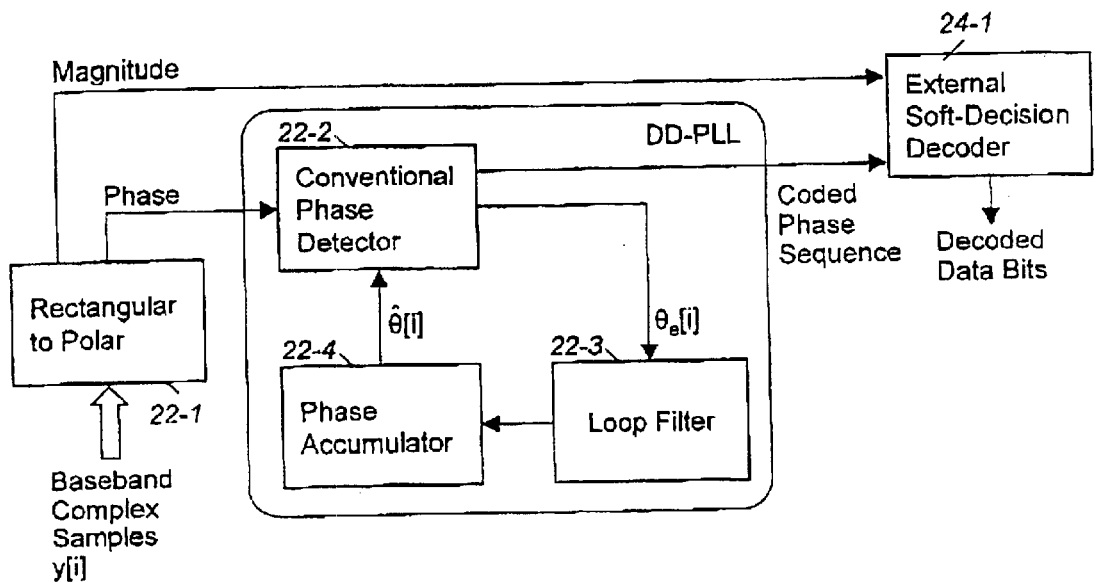
FIG. 2 illustrates a conventional decision directed phase locked loop (DD-PLL) with an external soft-decision decoder unit.

FIG. 2 illustrates a conventional decision directed phase locked loop (DD-PLL) in demodulator 22 for performing phase tracking of either a BPSK or QPSK modulated signal from the transmitter 10. A rectangular to polar converter 22-1 converts baseband complex samples into equivalent variable pairs of magnitude and phase signals. The decision directed phase locked loop receives only the phase angles of the received complex samples for operation. A conventional phase detector 22-2, loop filter 22-3, and phase accumulator 22-4 constitute the phase locked loop. The apparent incoming phase is referenced to the current tracked phase loop to yield a phase difference and output a coded phase sequence.

The value of the phase difference between the incoming phase and the tracked phase is influenced by the true difference between the phase systems of the transmitter 10 and the receiver 20, by phase and thermal noise present at the receiver 20, and also by the symbol's data content which changes the angle by a multiple of $\pi/2$ for quaternary phase shift keying (QPSK) or of $\pi$ for binary phase shift keying (BPSK). The stabilized observation in polar coordinates of an input modulated signal is typically transformed back into the rectangular form by a polar-to-rectangular converter for subsequent processing, including soft decision decoding when error control is being utilized. As shown in FIG. 2, a soft-decision decoder unit 24-1 external and subsequent to the decision directed phase locked loop of demodulator 22 receives the coded phase sequence from the phase locked loop and the magnitude signals from the rectangular to polar converter.

In basic decision directed phase locked loops (DD-PLLs), the effect of the data content is compensated by making a "hard" decision on the data content of the symbol. Conceptually, the resultant bit or dibit decision is used to derotate and place the result in a reference half-plane or quadrant, (for BPSK or QPSK, respectively). For purposes of discussion, the input modulated signal as described by the invention is a quaternary phase shift keying (QPSK) modulated signal. However, a binary phase shift keying (BPSK) modulated signal is also intended with minor variations. In fact, the derotation is usually effected by changing the signal in multiples of $\pi/2$ until such time as the resultant phase error is in the range of $-\pi/4$ to $+\pi/4$, which is tantamount to forming the "hard decision" referred to above.

In the absence of noise in a sequence of complex sample pairs, the decision is always correct so that the resultant error estimate equals the true difference between the phase systems of the transmitter 10 and the receiver 20. The value is then filtered to yield an updated estimate for use at the next symbol epoch, forming a classical servo loop. In all practical communication systems, however, noise is always present so that the resultant error estimate may be grossly distorted, especially when the wrong decision is made in converting the phase difference between the incoming phase and the currently tracked phase to the resultant error estimate. So long as the error rate is small, these exemplary decision directed phase locked-loops (DD-PLLs) perform satisfactorily. However, at low signal to noise ratios, the effect of wrong or incorrect decisions further exacerbates the degradation of tracking loop performance resulting from the large amount of noise entering the phase locked loop (PLL), and causes the tracking loop performance to degrade. In fact, the variance of the recovered variable increases faster than the signal to noise ratio degrades. This result is particularly damaging for communication systems that utilize large constellation signal sets to communicate at very low signal to noise ratios—as, for example, with error correcting block codes.

In the basic decision directed phase locked loop (DD-PLL) as shown in FIG. 2, each decision is based on an individual symbol basis, on the tacit assumption that the data content is statistically independent from epoch to epoch. When coding is used, however, such an assumption is sub-optimum, since the data content of a set of symbols may be linked together over several epochs because of the redundancy present in the code. A short block code, such as the (8,4) biorthogonal binary code (also known as a Reed-Muller code and by other aliases), can be used and recovered by a maximum likelihood decision based on a set of eight (8) soft decisions from four symbols, assuming that quaternary phase shift keying (QPSK) modulated signal is used. (The Reed-Muller codes are described in the following references: Mitani, N. "On the Transmission of Numbers in a Sequential Computer," Delivered at the National Convention of the Institute of Electrical Communication Engineers of Japan, November 1951; Honda, N., "The Sequential Error-Correcting Code," Sci. Repts. Tohoku Univ., Series B, 8 no. 3, 1956; Slepian, D., "A Class of Binary Signaling Alphabets," Bell System Tech. J., 35, 203–234, 1956; Slepian, D., "A Note on Two Binary Signaling Alphabets," IRE Trans., IT-2, 84–86, 1956; Reed, I. S., "A Class of Multiple-Error-Correcting Codes and the Decoding Scheme," IRE Trans., PGIT-4, 38–49, 1954; and Muller, D. E., "Application of Boolean Algebra to Switching Circuit Design and Error Detection," IRE Trans., Ec-3, 6–12, 1954.) However, other specific block codes may also be used in lieu of the Reed-Muller biorthogonal codes. In principle, any (n, k) block code may be used in lieu of the (8, 4) biorthogonal code described herein as the preferred embodiment of the present invention. Examples may include the Extended Hamming (12,8) code (described in: Golay, M. J. E., "Notes on Digital Coding," Proc. IEEE, 37, 657, 1949; Golay, M. J. E., "Anent Codes, Priorities, Patents, etc.," Proc. IEEE, 64, 572, 1976; and Hamming, R. W., "Error Detecting and Error Correcting Codes," Bell Syst. Tech. J., 29, 147–160, 1950) and the Nordstrom-Robinson (16,8) code (described in Nordstrom, A. W., and J. P. Robinson, "An Optimum Nonlinear Code," Info. And Control, 11, 613–616, 1967). Codes with "k" larger than eight (8) are of reduced interest for many applications where the block code referred to in the present invention often forms the inner code in a concatenated code structure having a Reed Solomon code over GF (2^8) as the outer code. Also codes with large "n" are of reduced interest because, as subsequently described, the update rate of the phase locked loop of the present invention is once per codeword epoch (rather than once per symbol epoch of an exemplary decision directed phase locked loop), and this update rate may not be made very low since any frequency offset must be corrected.

In order to improve the performance of the decision directed phase locked loop (DD-PLL) at low signal-to-noise ratios, an improved decision directed phase locked loop (DD-PLL) has been proposed in U.S. Pat. No. 6,236,687, commonly assigned to TRW Inc., the assigned of this patent application, and hereby incorporated by reference in its entirety, that utilizes a block decoder inside the phase locked loop. As is known from the subject matter incorporated by reference, the improved decision directed phase locked loop (DD-PLL) comprises a block decoder, such as a Reed-Muller block decoder, for decoding the set of vector pairs of phase stabilized observables in rectangular form at a decode rate to generate decoded data. The decoded data at each codeword is provided to the loop filter 22-3 to yield an update of an estimated phase at every codeword.

Figure 3:
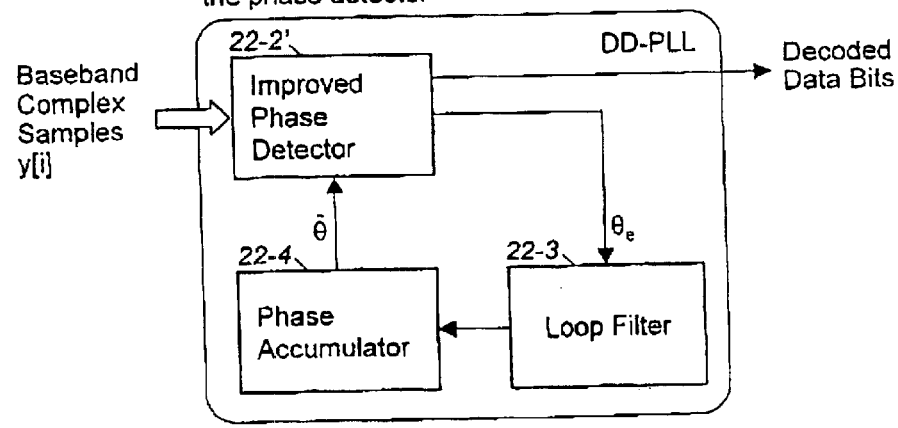
FIG. 3 is a circuit diagram of a preferred embodiment of a communications receiver in which the preferred embodiments of the invention may be practiced.

Unlike the conventional decision directed phase detector, where data decisions are made on a symbol-by-symbol basis, the improved phase detector 22-2' in FIG. 3 operates on a group of symbols (or a codeword) at a time. It requires both the real and imaginary (or magnitude and phase) components of the received complex samples for soft-decision decoding. The conventional phase detector 22-2, on the other hand, only requires the phase angles of the received complex samples for operation. Since coded decisions are generally more reliable than uncoded decisions, a lower error rate is achieved with coding which in turn causes the tracking loop performance to improve.

Figure 4:
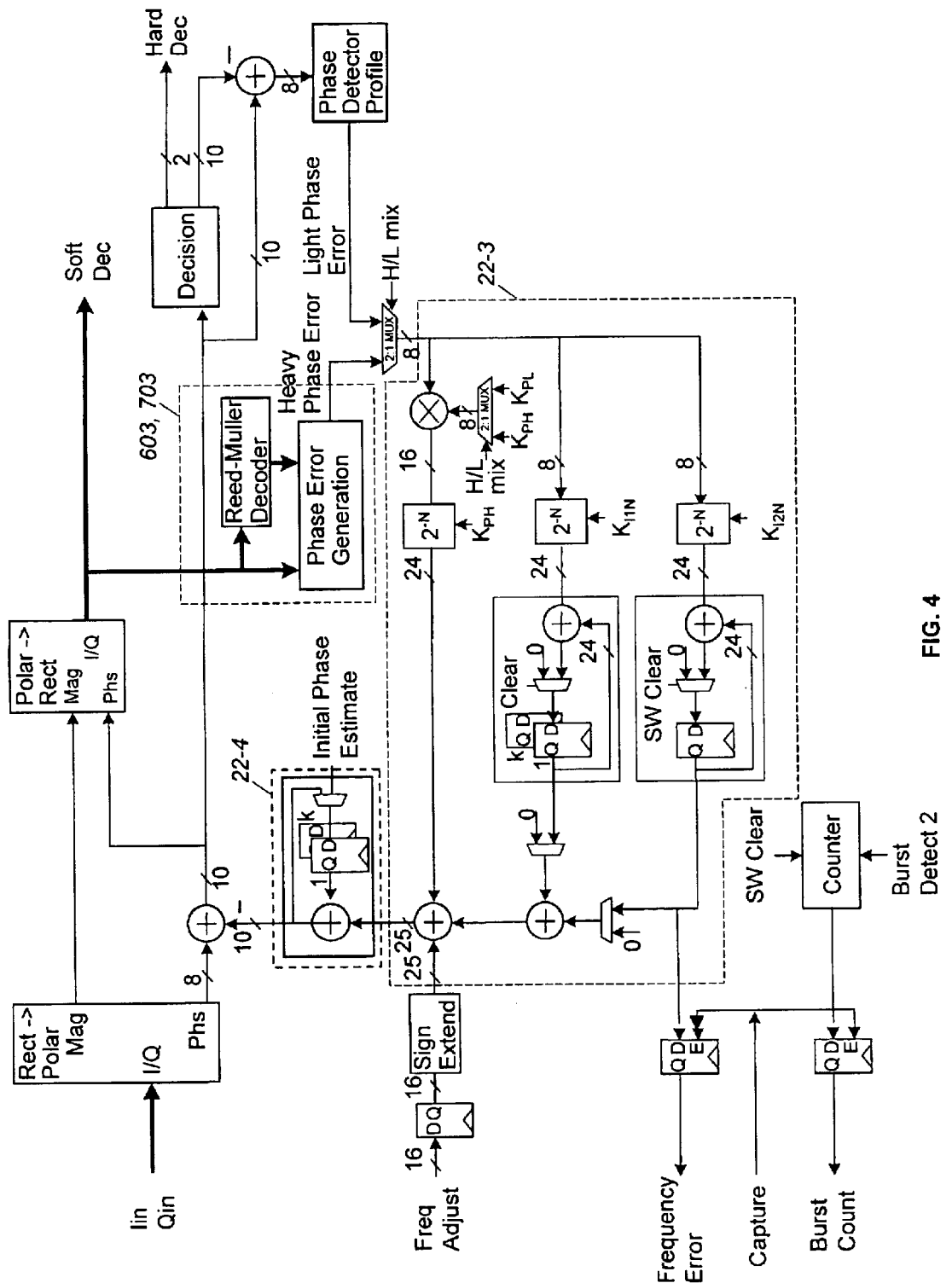
FIG. 4 is a more detailed diagram of the preferred embodiment shown in the circuit diagram of FIG. 3.
Figure 5:
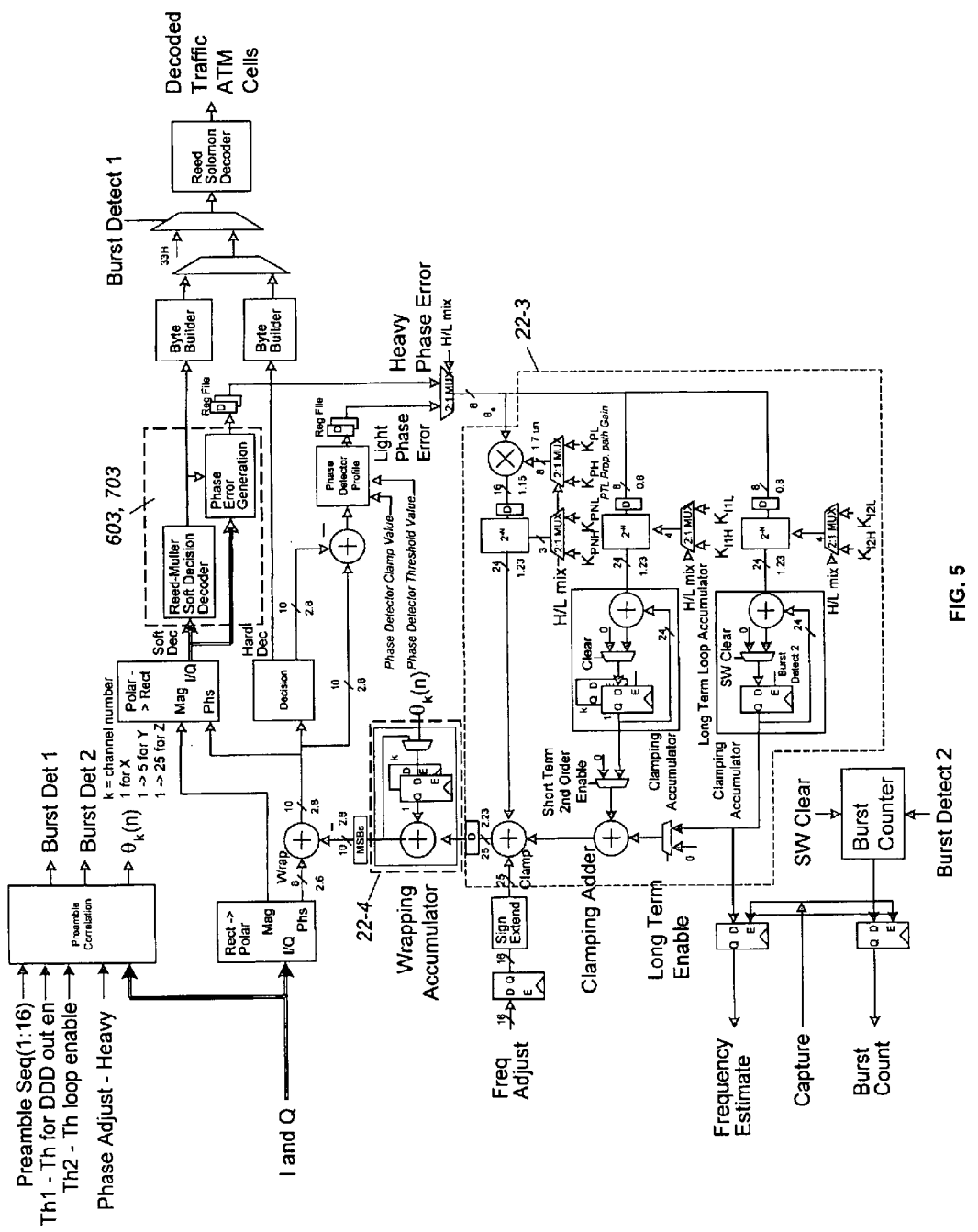
FIG. 5 illustrates an improved decision directed phase locked loop with the soft-decision decoder insider the phase detector.

Of course, as described above, the phase locked loop is not a standalone circuit and must be implemented in a communications receiver along with other circuits. FIGS. 4 and 5 shows a circuit environment including a phase locked loop, such as the phase locked loop shown in FIG. 3, with an inner block decoder, such as a Reed-Muller decoder, for use with short block codes and an outer Reed-Solomon block decoder. The inner block decoder is shown in further detail with respect to the preferred implementations therefore in FIGS. 6 and 7. The details of appropriate embodiments of loop filter 22-3 and phase accumulator 22-4 are shown in FIGS. 4 and 5. However, other embodiments may be utilized as well.

Figure 6:
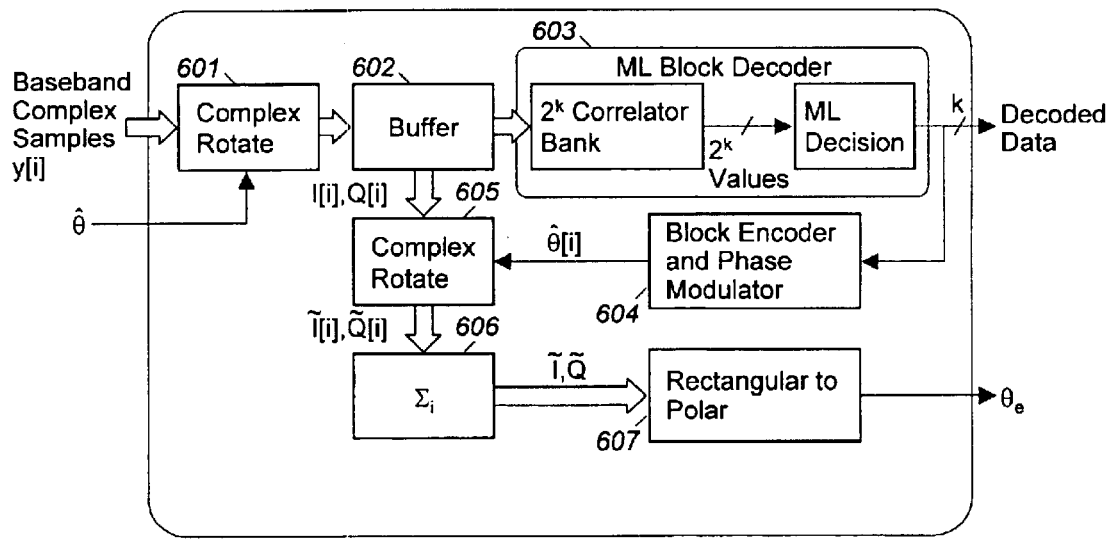
FIG. 6 illustrates a first implementation embodiment of an improved phase detector according to the invention.
Figure 7:
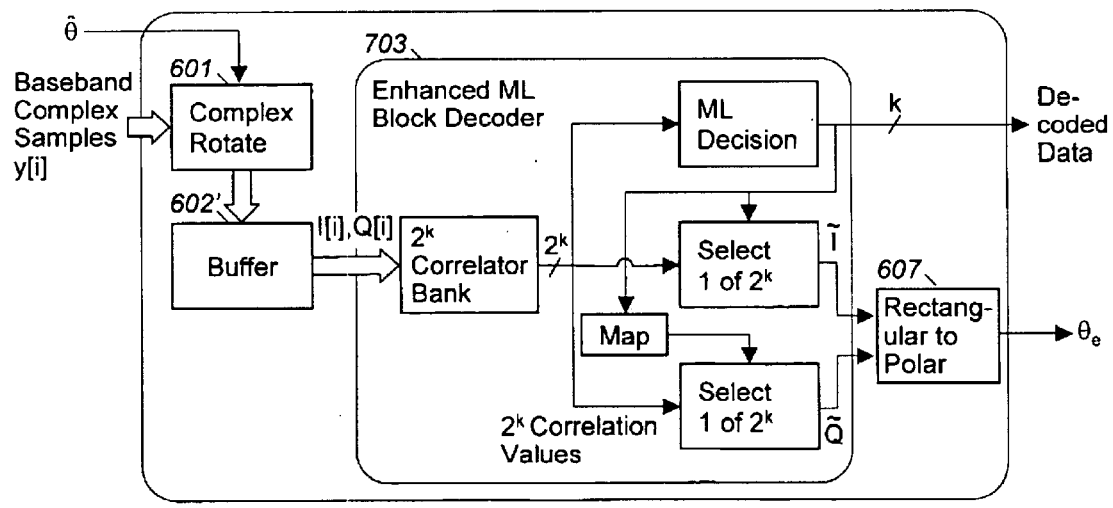
FIG. 7 illustrates a second implementation embodiment of an improved phase detector according to the invention.
Figure 8:
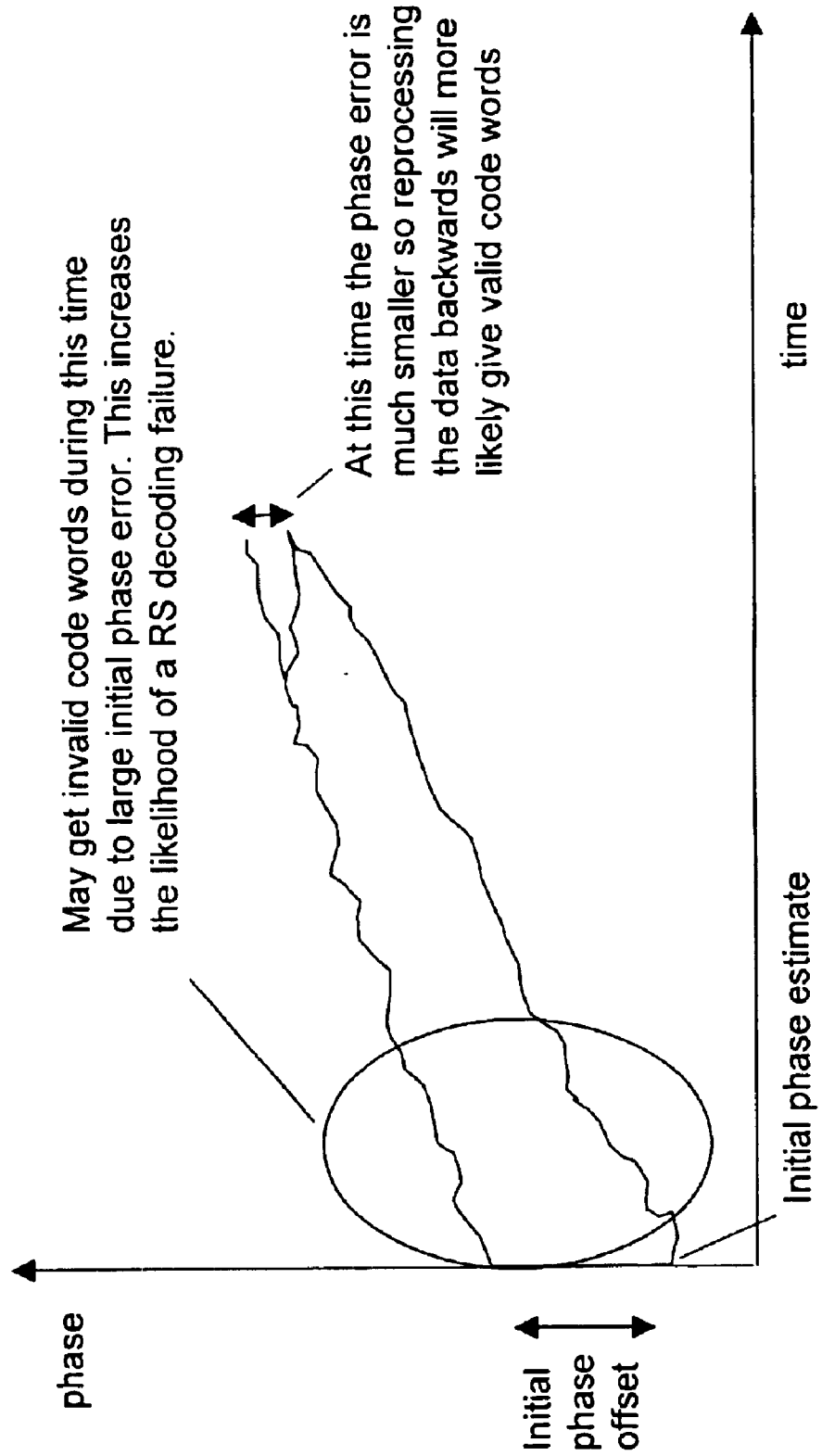
FIG. 8 is a graphical illustration of the relationship between the actual phase of a communications waveform and the estimate of the communications waveform in a phase tracking loop of a demodulator with respect to time.

We will next discuss the preferred implementations of the phase locked loop shown in FIGS. 6 and 7. In order to explain the operation of the embodiments in FIGS. 6 and 7, we shall consider as an example the bi-orthogonal rate 4/8 Reed-Muller (RM) block code and the Quadrature Phase Shift Keying (QPSK) modulation scheme. Of course, other codes such as Nordstrom-Robinson, Golay and quadratic residue codes may also be used.

The block encoding operation at the transmitter consists of grouping the sequence of binary information data into blocks of 4 bits, and then determining the 8 bit codeword associated with each of the blocks. Since there are 16 possible 4-bit patterns, this task may be accomplished by using a so called codeword lookup table as shown below:

| Information Bit Pattern | Associated Codeword |
|---|---|
| 0 0 0 0 | 0 0 0 0 0 0 0 0 |
| 0 0 0 1 | 0 0 0 0 1 1 1 1 |
| 0 0 1 0 | 0 0 1 1 0 0 1 1 |
| 0 0 1 1 | 0 0 1 1 1 1 0 0 |

-continued

| Information Bit Pattern | Associated Codeword |
|---|---|
| 0 1 0 0 | 0 1 0 1 0 1 0 1 |
| 0 1 0 1 | 0 1 0 1 1 0 1 0 |
| 0 1 1 0 | 0 1 1 0 0 1 1 0 |
| 0 1 1 1 | 0 1 1 0 1 0 0 1 |
| 1 0 0 0 | 1 1 1 1 1 1 1 1 |
| 1 0 0 1 | 1 1 1 1 0 0 0 0 |
| 1 0 1 0 | 1 1 0 0 1 1 0 0 |
| 1 0 1 1 | 1 1 0 0 0 0 1 1 |
| 1 1 0 0 | 1 0 1 0 1 0 1 0 |
| 1 1 0 1 | 1 0 1 0 0 1 0 1 |
| 1 1 1 0 | 1 0 0 1 1 0 0 1 |
| 1 1 1 1 | 1 0 0 1 0 1 1 0 |

In digital communication, modulation is often represented by mapping patterns of 0's and 1's onto a set of complex numbers also referred to as signal constellation points. For example in Quadrature Phase Shift Keying (QPSK), 2-bit patterns determine one of 4 possible constellation points according to the table:

| 2-Bit Pattern | Constellation Point |
|---|---|
| 0 0 | $+1+j$ |
| 0 1 | $+1-j$ |
| 1 0 | $-1+j$ |
| 1 1 | $-1-j$ |

Since modulation is performed on the coded binary sequence, each of the possible codewords may be mapped, using the Quadrature Phase Shift Keying (QPSK) mapping, in order to obtain what is called the modulated codeword lookup table:

| Information Bit Pattern | Associated Codeword | Associated Modulated Codeword |
|---|---|---|
| 0 0 0 0 | 0 0 0 0 0 0 0 0 | $+1+j$ $+1+j$ $+1+j$ $+1+j$ |
| 0 0 0 1 | 0 0 0 0 1 1 1 1 | $+1+j$ $+1+j$ $-1-j$ $-1-j$ |
| 0 0 1 0 | 0 0 1 1 0 0 1 1 | $+1+j$ $-1-j$ $+1+j$ $-1-j$ |
| 0 0 1 1 | 0 0 1 1 1 1 0 0 | $+1+j$ $-1-j$ $-1-j$ $+1+j$ |
| 0 1 0 0 | 0 1 0 1 0 1 0 1 | $+1-j$ $+1-j$ $+1-j$ $+1-j$ |
| 0 1 0 1 | 0 1 0 1 1 0 1 0 | $+1-j$ $+1-j$ $-1+j$ $-1+j$ |
| 0 1 1 0 | 0 1 1 0 0 1 1 0 | $+1-j$ $-1+j$ $+1-j$ $-1+j$ |
| 0 1 1 1 | 0 1 1 0 1 0 0 1 | $+1-j$ $-1+j$ $-1+j$ $+1-j$ |
| 1 0 0 0 | 1 1 1 1 1 1 1 1 | $-1-j$ $-1-j$ $-1-j$ $-1-j$ |
| 1 0 0 1 | 1 1 1 1 0 0 0 0 | $-1-j$ $-1-j$ $+1+j$ $+1+j$ |
| 1 0 1 0 | 1 1 0 0 1 1 0 0 | $-1-j$ $+1+j$ $-1-j$ $+1+j$ |
| 1 0 1 1 | 1 1 0 0 0 0 1 1 | $-1-j$ $+1+j$ $+1+j$ $-1-j$ |
| 1 1 0 0 | 1 0 1 0 1 0 1 0 | $-1+j$ $-1+j$ $-1+j$ $-1+j$ |
| 1 1 0 1 | 1 0 1 0 0 1 0 1 | $-1+j$ $-1+j$ $+1-j$ $+1-j$ |
| 1 1 1 0 | 1 0 0 1 1 0 0 1 | $-1+j$ $+1-j$ $-1+j$ $+1-j$ |
| 1 1 1 1 | 1 0 0 1 0 1 1 0 | $-1+j$ $+1-j$ $+1-j$ $-1+j$ |

We shall call the complex numbers of a modulated codeword the transmitted symbols, because they represent, in a mathematically equivalent way, the actual waveform transmitted through the communication channel. The transmitted symbols may experience multiplicative distortions of amplitude and phase as well as additive disturbances due to thermal noise in both the real and imaginary components. Focusing on the transmission of one modulated codeword at a time, the above mentioned channel distortion effects may be described mathematically by the equation:

$$y[i] = \alpha[i]x[i] + n[i] \quad i=1,\ldots,4$$

where $\alpha[i]$ and $n[i]$ are complex variables representing the multiplicative distortion and the additive noise disturbance respectively. The sequence $x[1] \ldots x[4]$ is the transmitted symbol sequence associated with a codeword (i.e. the modulated codeword) and $y[1] \ldots y[4]$ is the sequence of received symbols.

Phase tracking systems, in general, aim at tracking the angular phase variations of the multiplicative distortion factor $\alpha[i]$ over time. The phase angle of $\alpha[i]$ is called the channel phase and denoted $\theta[i]$. The goal of the decision directed phase locked loop (DD-PLL) is to provide at the receiver an estimate of the channel phase, denoted $\hat{\theta}[i]$, which can then be used to rotate the received symbols $y[i]$ by an equal amount but in the opposite direction as the channel phase. If the channel phase estimates are accurate, the phase distortion effects introduced by the channel can be significantly reduced prior to block decoding.

In the conventional decision directed phase locked loop (DD-PLL) shown in FIG. 2, only the phase angles of the received complex symbols $y[i]$ are processed by the loop on a symbol by symbol basis. The phase detector 22-2 internally subtracts the phase estimate of the loop $\hat{\theta}[i]$ from the received phase and makes a decision as to which of the four QPSK phases is the most likely. The phase decisions are then provided to external decoder 24-1 along with magnitudes of the received symbols $y[i]$ for soft decision block decoding. The phase detector 22-2 further subtracts the decided QPSK phase from the received phase in order to remove the phase variation due to data modulation. The residual phase $\theta_e[i]$ becomes the feedback phase error term that is filtered by the loop filter 22-3 and added in by the phase accumulator 22-4 in order to update the loop's channel phase estimate $\hat{\theta}[i]$.

In the improved decision directed phase locked loop (DD-PLL) of FIG. 3, the task of soft-decision block decoding is performed inside the improved phase detector 22-2'. While the conventional phase detector 22-2 made QPSK decisions on a symbol by symbol basis, the improved phase detector 22-2' collects 4 QPSK symbols and then makes a codeword decision. Since coded decisions are generally more reliable than uncoded decisions, the lower error rate enables the improved phase detector 22-2' to provide a more reliable feedback phase error term, which in turn yields a more accurate estimate of the channel phase.

In a preferred embodiment according to the invention, the phase locked loop tracks and stores the data for a group of symbols. The incoming data samples are stored while the phase locked loop operates on the incoming symbols. After a group of data symbols consisting of the first data symbols are received, those data symbols are run backwards through the phase locked loop to more reliably decode the incoming symbols. This works because the initial phase error term is expected to be reduced significantly after processing the group of data symbols. Only after this has been occurred are the phase estimates produced by the phase locked loop assumed to be accurate. While the group of symbols consisting of the first data symbols are being processed by the phase locked loop, subsequent samples can be processed or they can be stored for later processing.

The improvement in performance achieved by the improved decision directed phase locked loop (DD-PLL) however, comes with much added complexity in the hardware design of the loop. By comparing FIG. 2 and FIG. 3, one can see that the main component affected by the improved design is the phase detector 22-2. A conceptually intuitive implementation of the improved phase detector 22-2' is shown in FIG. 6, and a functionally equivalent but more efficient implementation of the improved phase detector 22-2', as proposed by the current invention, is shown in FIG. 7. The following paragraphs explain why these two implementations are functionally equivalent by tracing the internal operations of FIG. 6, and showing that it produces the same output as FIG. 7.

The first operation performed inside the improved phase detector of FIG. 6 is the rotation of the received samples $y[i]$ in the complex plane by $-\hat{\theta}$. This first de-rotation step is carried out by the complex rotate module 601 and can be expressed mathematically by the linear transformations:

$$\begin{bmatrix} I[i] \\ Q[i] \end{bmatrix} = \begin{bmatrix} \cos(-\hat{\theta}) & -\sin(-\hat{\theta}) \\ \sin(-\hat{\theta}) & \cos(-\hat{\theta}) \end{bmatrix} \begin{bmatrix} \text{Re}\{y[i]\} \\ \text{Im}\{y[i]\} \end{bmatrix} i = 1, \ldots, 4$$

Since the loop's channel phase estimate is updated once per codeword, the received symbols $y[1] \ldots y[4]$ are all rotated by the same angle $-\hat{\theta}$, i.e. $\hat{\theta}[i] = \hat{\theta}$ for all $i=1, \ldots, 4$.

The vectors resulting from the first de-rotation step are collected in the buffer 602 and then passed on to the maximum-likelihood (ML) block decoder 603 for soft-decision decoding. The decoder correlates the sequence it receives with all of the 16 possible codewords and selects the one with the largest correlation. The 4-bit information bit pattern associated with the winning codeword is then outputted by the decoder 603. In order to remove the data phase rotations from the received samples, the decoded 4-bit pattern must be re-encoded and phase modulated, just as in the transmitter. This task is performed by the block encoder and phase modulator module 604 which outputs the coded phase angles $\hat{\phi}[i]$, $i=1, \ldots, 4$, associated with the winning modulated codeword.

A second de-rotation step is next performed by the complex rotate module 605 to "wipe-off" the data modulation from the resultant vectors of the first de-rotation step. This step may be written mathematically as:

$$\begin{bmatrix} \tilde{I}[i] \\ \tilde{Q}[i] \end{bmatrix} = \begin{bmatrix} \cos(-\hat{\phi}[i]) & -\sin(-\hat{\phi}[i]) \\ \sin(-\hat{\phi}[i]) & \cos(-\hat{\phi}[i]) \end{bmatrix} \begin{bmatrix} I[i] \\ Q[i] \end{bmatrix} i = 1, \ldots, 4$$

Since the phase sequence associated with the winning codeword, $\hat{\phi}[i]$, only takes values on the set $$\left\{ \frac{\pi}{4}, \frac{3\pi}{4}, \frac{5\pi}{4}, \frac{7\pi}{4} \right\},$$

the resultant vectors of the second de-rotation step may equivalently be expressed as:

$$\begin{bmatrix} \tilde{I}[i] \\ \tilde{Q}[i] \end{bmatrix} = \frac{1}{\sqrt{2}} \begin{bmatrix} a_i I[i] + b_i Q[i] \\ c_i I[i] + d_i Q[i] \end{bmatrix} i = 1, \ldots, 4$$

where $a_i$, $b_i$, $c_i$ and $d_i$ are the coefficients used to compute $\tilde{I}[i]$ and $\tilde{Q}[i]$. These coefficients are either +1 or −1, and additionally, $a_i = d_i$ and $b_i = -c_i$.

Now that the data phase angles have also been subtracted out of the received signal, the resultant four vectors of the second de-rotation step are added together by the summation module 606 to produce:

$$\begin{bmatrix} \tilde{I} \\ \tilde{Q} \end{bmatrix} = \sum_{i=1}^{4} \begin{bmatrix} \tilde{I}[i] \\ \tilde{Q}[i] \end{bmatrix} = \frac{1}{\sqrt{2}} \begin{bmatrix} \sum_{i=1}^{4} a_i I[i] + b_i Q[i] \\ \sum_{i=1}^{4} c_i I[i] + d_i Q[i] \end{bmatrix}$$

The coefficients $a_i$, $b_i$, and $c_i$, $d_i$ determine whether the terms $\tilde{I}[i]$ and $\tilde{Q}[i]$ should be added or subtracted by the summation to produce $\tilde{I}$ and $\tilde{Q}$. Since these coefficients depend on the winning codeword selected by the block decoder 603, the following table lists the coefficient values for every possible codeword decision:

| Decided Codeword | Coefficients for $\tilde{I}$ | | | | | | | | Coefficients for $\tilde{Q}$ | | | | | | | |
|---|---|---|---|---|---|---|---|---|---|---|---|---|---|---|---|---|
| | $a_1$ | $b_1$ | $a_2$ | $b_2$ | $a_3$ | $b_3$ | $a_4$ | $b_4$ | $c_1$ | $d_1$ | $c_2$ | $d_2$ | $c_3$ | $d_3$ | $c_4$ | $d_4$ |
| 0 0 0 0 0 0 0 0 | +1 | +1 | +1 | +1 | +1 | +1 | +1 | +1 | −1 | +1 | −1 | +1 | −1 | +1 | −1 | +1 |
| 0 0 0 0 1 1 1 1 | +1 | +1 | +1 | +1 | −1 | −1 | −1 | −1 | −1 | +1 | −1 | +1 | +1 | −1 | +1 | −1 |
| 0 0 1 1 0 0 1 1 | +1 | +1 | −1 | −1 | +1 | +1 | −1 | −1 | −1 | +1 | +1 | −1 | −1 | +1 | +1 | −1 |
| 0 0 1 1 1 1 0 0 | +1 | +1 | −1 | −1 | −1 | −1 | +1 | +1 | −1 | +1 | +1 | −1 | +1 | −1 | −1 | +1 |
| 0 1 0 1 0 1 0 1 | +1 | −1 | +1 | −1 | +1 | −1 | +1 | −1 | +1 | +1 | +1 | +1 | +1 | +1 | +1 | +1 |
| 0 1 0 1 1 0 1 0 | +1 | −1 | +1 | −1 | −1 | +1 | −1 | +1 | +1 | +1 | +1 | +1 | −1 | −1 | −1 | −1 |
| 0 1 1 0 0 1 1 0 | +1 | −1 | −1 | +1 | +1 | −1 | −1 | +1 | +1 | +1 | −1 | −1 | +1 | +1 | −1 | −1 |
| 0 1 1 0 1 0 0 1 | +1 | −1 | −1 | +1 | −1 | +1 | +1 | −1 | +1 | +1 | −1 | −1 | −1 | −1 | +1 | +1 |
| 1 1 1 1 1 1 1 1 | −1 | −1 | −1 | −1 | −1 | −1 | −1 | −1 | +1 | −1 | +1 | −1 | +1 | −1 | +1 | −1 |
| 1 1 1 1 0 0 0 0 | −1 | −1 | −1 | −1 | +1 | +1 | +1 | +1 | +1 | −1 | +1 | −1 | −1 | +1 | −1 | +1 |
| 1 1 0 0 1 1 0 0 | −1 | −1 | +1 | +1 | −1 | −1 | +1 | +1 | +1 | −1 | −1 | +1 | +1 | −1 | −1 | +1 |
| 1 1 0 0 0 0 1 1 | −1 | −1 | +1 | +1 | +1 | +1 | −1 | −1 | +1 | −1 | −1 | +1 | −1 | +1 | +1 | −1 |
| 1 0 1 0 1 0 1 0 | −1 | +1 | −1 | +1 | −1 | +1 | −1 | +1 | −1 | −1 | −1 | −1 | −1 | −1 | −1 | −1 |
| 1 0 1 0 0 1 0 1 | −1 | +1 | −1 | +1 | +1 | −1 | +1 | −1 | −1 | −1 | −1 | −1 | +1 | +1 | +1 | +1 |
| 1 0 0 1 1 0 0 1 | −1 | +1 | +1 | −1 | −1 | +1 | +1 | −1 | −1 | −1 | +1 | +1 | −1 | −1 | +1 | +1 |
| 1 0 0 1 0 1 1 0 | −1 | +1 | +1 | −1 | +1 | −1 | −1 | +1 | −1 | −1 | +1 | +1 | +1 | +1 | −1 | −1 |

Finally, the angle of the sum vector is determined by a rectangular-to-polar conversion module 607, and provided as the feedback phase error term $\theta_e$:

$$\theta_e = \tan^{-1} \frac{\tilde{Q}}{\tilde{I}}$$

As proposed, the phase detector of FIG. 7 is more efficient than the phase detector shown in FIG. 6. The key realization in supporting this claim is that $\tilde{I}$ and $\tilde{Q}$ are already computed internally by the block decoder 603. The coefficients used in the computation of $\tilde{Q}$ are exactly the same ones used in the computation of $\tilde{I}$ corresponding to a different codeword decision, i.e. rows of the third column are the permuted rows of the second column in the above coefficient table. The terms $\tilde{I}$ and $\tilde{Q}$ in fact correspond to 2 of the 16 correlation values computed in parallel by the decoder. The determination of which correlation values to pass on as $\tilde{I}$ and $\tilde{Q}$ is based on the codeword decision or equivalently the decoded 4-bit pattern. The enhanced block decoder 703 of FIG. 7 shows that by adding very simple selection circuitry, $\tilde{I}$ and $\tilde{Q}$ can be obtained directly. For example, if the decided codeword was "00000000", then according to the above coefficient table, the selection circuitry would select the correlation values associated with the codewords "00000000" and "10101010" as the $\tilde{I}$ and $\tilde{Q}$ terms respectively. By utilizing the otherwise discarded correlation values computed inside the decoder 703, much of the hardware complexities of FIG. 6 is taken away. In the implementation shown in FIG. 7, direct computation of $\tilde{I}$ and $\tilde{Q}$, are not required; therefore, the modules associated with the block encoder and phase modulator 604, the second complex rotator 605 and the summer 606 are not required. The selection circuits can be simple multiplexers and the map circuit in block decoder 703 follows directly from the permutation rule suggested by the coefficient table provided above.

The Reed-Muller Decoder and the phase error generation circuit are shown as separate functional blocks in FIGS. 4 and 5 merely to emphasize this implementation visually; they are hot separate pieces of hardware or processes and the phase error generation does not "follow" the Reed-Muller decoding.

In the circuitry of FIGS. 4 and 5, after Reed-Muller decoding, the effects of the data are again removed. However, use is made of correlation values already available from the decoding process itself to compute the phase error (or at least the heavy phase error). This is possible because during the correlation process (i.e., during Reed-Muller decoding), the hard decisions on the received data are correlated with the possible codewords and the one that matches best (has the highest correlation) is accepted as the decoded codeword. The correlation values that correspond to producing the winning codeword can be used again to remove the rotational effects on the phase error due to the data. Furthermore, this processing can be done in parallel to speed up the estimate for phase error.

The phase error generation, although shown as a unique functional block receiving the input and output of the Reed-Muller decoder, performs a derotation by retaining and using all of the bits of the most likely codeword as determined by the processing executed in the Reed-Muller decoder. By using the information already developed in the Reed-Muller decoder when estimating the phase error, the implementation in FIG. 7 provides the advantage that it is possible to reduce the number of gates necessary in the hardware to implement the phase locked loop. Furthermore, during the basic Reed-Muller decoding, the multiplication products can be computed in parallel and then combined. This provides the advantage that it is possible to reduce latency.

To provide a fair comparison of the demodulator described herein with a conventional demodulator, the PLL loop of the present invention having a block decoder, such as a Reed-Muller decoder, therein preferably has a wider noise bandwidth than the basic DD-PLL loop to account for the fact that it operates with a longer epoch. With the biorthogonal code example which updates every four symbols versus the use of every symbol for the basic DD-PPL loop, a first order tracking loop should have a gain constant that is four times larger so that the loop's tracking error resulting from a frequency difference between the transmitter and the receiver is the same as for the basic DD-PLL loop. Nevertheless, the overall loop performance is better with the PLL loop of the present invention because of the much lower error rate for the (8,4) biorthogonal code decisions, as compared to the symbol by symbol decisions of the basic DD-PLL loop.

As described, the demodulator according to the invention uses a block decoder for short block codes, including an (8, 4) biorthogonal code, within a phase locked loop to advantageously provide better phase tracking of either a binary phase shift keying (BPSK) modulated signal or a quaternary phase shift keying (QPSK) modulated signal using codeword level decisions rather than symbol by symbol decisions. Loop corrections are performed at decode rate, not symbol rate.

Several advantages are achieved by performing the rewind operation described above in paragraph [0041]. First, the phase tracking loop is improved by utilizing the inner block decoder within the phase locked loop. Since the initial phase estimate is generally poor at low signal-to-noise ratios, combining this with a rewind capability reduces codeword errors at the beginning of the phase tracking operation. By having the phase tracking loop process the first group of symbols, a more reliable phase estimate is obtained. Running the data backwards allows all of the data symbols to be processed with reduced phase errors resulting in a better symbol error rate. In addition, a more reliable initial phase estimate significantly reduces the likelihood that the phase tracking loop will select the incorrect QPSK decision point for a QPSK modulated signal waveform. What we are referring to as a decision point is usually called a lock-point in a conventional DD-PLL because there the PLL must restrict its subsequent decisions to lie in the lock-point region whereas we do not have that restriction with maximum likelihood decoding. After running the data backwards through the phase locked loop, the demodulator can re-process the preamble to determine the correct QPSK decision-point. This reduces the overhead of the uplink channel by eliminating a long preamble and instead adding a reduced size field for QPSK ambiguity resolution.

While there have been illustrated and described what are considered to be preferred embodiments of the present invention, it will be understood by those skilled in the art that various changes and modifications may be made, and equivalents may be substituted for elements thereof without departing from the true scope of the present invention. For example, any (n, k) block code may be used in lieu of the (8, 4) biorthogonal code described herein as the preferred embodiment. Examples of these block codes may include the Extended Hamming (12,8) code and the Nordstrom-Robinson (16,8) code. Similarly, other modulation formats may be used in lieu of the binary phase shift keying (BPSK) or the quaternary phase shift keying (QPSK) modulation as described as the preferred embodiment of the present invention. Examples of other modulation formats may include octonary phase shift keying (OPSK). Larger block codes such as the Extended Golay (24,12) code (described in Golay, M. J. E., "Notes on Digital Computing," Proc. IRE, 37, Correspondence, 657, 1949) using octonary phase shift keying (OPSK), Extended BCH (32,16) code (described in Bose, R. C., and D. K. Ray-Chaudhuri, "On a Class of Error Correcting Binary Group Codes," Info. and Control, 3, 68–79, 1960; Bose, R. C., and D. K. Ray-Chaudhuri, "Further Results on Error Correcting Binary Group Codes," Info. and Control, 3, 279–290, 1960; and Hocquenghem, A., "Codes Correcteurs D'erreurs," Chiffres (Paris), 2, 147–156, 1959) and Extended Quadratic Residue (48,24) code (described in Prange, E., Some Simple Error-Correcting Codes with Simple Decoding Algorithms, AFCRC-TN-58-156, Air Force Cambridge Research Center, Bedford, Mass., April 1958) may also be utilized for improved demodulation performance. If the (24, 12) extended Golay code using octonary phase shift keying (OPSK) is used where each symbol may correspond to three chips with eight symbols corresponding to a codeword, the derotation step for OPSK may be more complex than the simple swap and complement procedure described for QPSK. However, the fundamental concept of using a block decoder within the phase locked loop and running the data backwards after a group of symbols have been processed may be identical. Further, many modifications may be made to adapt a particular situation to the teachings of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A decision directed phase locked loop circuit, comprising:

a phase detector which receives a sequence of baseband complex samples and current phase estimates and generates phase differences between said sequence of baseband complex samples and current phase estimates;

an inner block decoder which decodes said sequence of baseband complex samples to generate partial decoder values and decoded data;

a phase error generation circuit which receives said sequence of baseband complex samples and said partial decoder values from said inner block decoder and which generates feedback phase error terms based on said sequence of baseband complex samples and said partial decoder values, wherein a group of baseband complex samples consisting of said sequence of baseband complex samples received by said phase detector are run backwards through said inner block decoder;

an outer block decoder which receives associated codewords generated by said inner block decoder and which utilizes and corrects only codewords associated with the sequence of baseband complex samples including and after the group of baseband complex samples consisting of said sequence of baseband complex samples received by said phase detector;

a loop filter which filters said feedback phase error terms; and a phase accumulator that updates the current phase estimate on each iteration of the decision directed phase locked loop circuit.

2. A decision directed phase locked loop circuit as claimed in claim 1, wherein the baseband complex samples are demodulated from an input modulated signal corresponding to one of a binary phase shift keying (BPSK) modulated signal and a quaternary phase shift keying (QPSK) modulated signal and encoded by a sequence of codewords.

3. A decision directed phase locked loop circuit as claimed in claim 2, wherein said codewords correspond to biorthogonal binary codes.

4. A decision directed phase locked loop circuit as claimed in claim 3, wherein each of said codewords contains four data symbols, and the decode rate for decoding a set of vector pairs of phase stabilized observables corresponds to one quarter of a symbol rate.

5. A decision directed phase locked loop circuit as claimed in claim 4, wherein said inner block decoder comprises a Reed-Muller block decoder.

6. A decision directed phase locked loop circuit as claimed in claim 5, wherein said phase error generation circuit generates said feedback phase error terms based on a composite decoded codeword phase error relative to a reference value.

7. A decision directed phase locked loop circuit as claimed in claim 6, wherein said current phase estimate is updated at one quarter the symbol rate.

8. A decision directed phase locked loop circuit as claimed in claim 6, wherein said current phase estimate is updated every codeword of four data symbols.

9. A decision directed phase locked loop circuit as claimed in claim 1, wherein said phase detector includes a subtractor for subtracting the incoming phase of said baseband complex samples from the current phase estimate to generate said phase differences.

10. A demodulator for demodulating a modulated signal waveform in a data communication system, comprising:
a phase tracking loop tracking a phase of said modulated signal waveform and having an inner block decoder configured to decode a set of vector pairs of the modulated signal waveform at a decode rate to generate associated codewords and phase estimates, wherein a group of data symbols consisting of data symbols of the modulated signal waveform are run backwards through the phase tracking loop; and
an outer block decoder which receives the associated codewords generated by said inner block decoder and which utilizes and corrects only codewords associated with symbols after the group of data symbols consisting of the data symbols of the modulated signal waveform.

11. A demodulator as claimed in claim 10, wherein said inner block decoder comprises a Reed-Muller block decoder.

12. A demodulator as claimed in claim 11, wherein said Reed-Muller block decoder determines a phase error estimate based on a composite decoded codeword phase error relative to a reference value.

13. A demodulator as claimed in claim 10, wherein said group of data symbols consisting of the data symbols of the modulated signal waveform are stored in the demodulator.

14. A demodulator as recited in claim 10, wherein said outer block decoder comprises a Reed-Solomon block decoder.

15. A demodulator as claimed in claim 10, wherein the modulated signal waveform is a QPSK modulated waveform and a QPSK ambiguity resolution is determined after the group of data symbols is run backwards through the phase tracking loop.

16. A demodulator as claimed in claim 15, wherein the data is rotated based on the QPSK ambiguity resolution.

17. A communication receiver using a demodulator demodulating a modulated signal waveform from a transmission channel which is encoded by a sequence of codewords, comprising:
a down converter which generates a succession of baseband signal samples of said modulated signal waveform including an in-phase component and a quadrature-phase component;
a first converter which converts said succession of baseband signal samples of said modulated signal waveform from a rectangular form into a pair of polar coordinates having an incoming phase;
a phase tracking loop which estimates the phase of said modulated signal waveform, said phase locked loop comprising:
a comparator which generates a phase difference of said incoming phase of said modulated signal waveform and an estimated phase;
a second converter which converts said pair of polar coordinates having said phase difference into a set of vector pairs of phase stabilized observables in a rectangular form;
a first block decoder which decodes said set of vector pairs of phase stabilized observables in said rectangular form at a decode rate to generate associated codewords; and
a loop filter which filters said associated codewords from said block decoder to yield an update of said estimated phase for each associated codeword; and
wherein a group of data symbols consisting of data symbols of the modulated signal waveform are run backwards through the phase tracking loop and a second block decoder which receives the associated codewords generated by said first block decoder and which utilizes and corrects only codewords associated with symbols including and after the group of data symbols consisting of the data symbols of modulated signal waveform.

18. A communication receiver as claimed in claim 17, wherein said modulated signal waveform comprises a phase shift keying modulated signal.

19. A communication receiver as claimed in claim 17, wherein said first block decoder also generates reliability metric results.

20. A communication receiver as claimed in claim 19, wherein said reliability metric results comprise correlation results taken during decoding by said first block decoder.

21. A communication receiver as claimed in claim 19, wherein said second block decoder dynamically selects codewords from said associated codewords.

22. A communication receiver as claimed in claim 17, wherein said first block decoder comprises a Reed-Muller block decoder.

23. A communication receiver as claimed in claim 22, wherein said Reed-Muller block decoder determines the phase error estimate based on a composite decoded codeword phase error relative to a reference value.

24. A communication receiver as claimed in claim 18, wherein said phase tracking loop subtracts the incoming phase of said modulated signal waveform from the estimated phase to generate the phase difference for tracking the modulated signal waveform.

* * * * *